E. E. ELLIS.
HAMMER HANDLE ATTACHMENT.
APPLICATION FILED OCT. 1, 1913.
1,142,946.
Patented June 15, 1915.
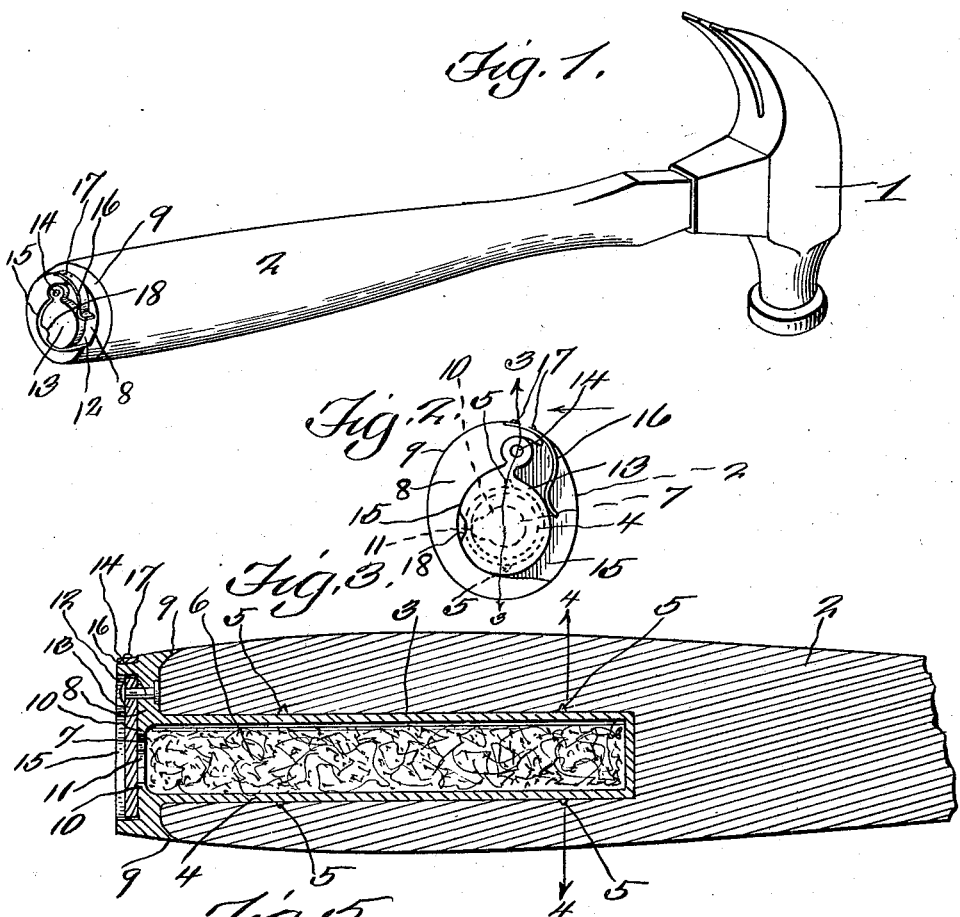
Inventor
Elmer E. Ellis,

UNITED STATES PATENT OFFICE.

ELMER E. ELLIS, OF POMONA, CALIFORNIA.

HAMMER-HANDLE ATTACHMENT.

1,142,946. Specification of Letters Patent. Patented June 15, 1915.

Application filed October 1, 1913. Serial No. 792,805.

*To all whom it may concern:*

Be it known that I, ELMER E. ELLIS, a citizen of the United States, residing at Pomona, in the county of Los Angeles and State of California, have invented a new and useful Hammer-Handle Attachment; and I do hereby declare the following to be a full, clear, and exact description of the invention, such as will enable others skilled in the art to which it appertains to make and use the same.

This invention relates to a hammer handle attachment such as a lubricant container comprising a tube into the lubricant of which a nail or the like may be inserted, so that the nail may become coated with the wax sufficiently, whereby the nail may be driven easily in hard wood.

One of the objects of the invention is to provide a lubricant container that may be easily applied to any stock hammer handle, just by boring a hole lengthwise in the handle and driving the tube therein.

One of the features of the invention is the provision of a metal disk integral with the container tube, which disk constitutes a metal handle end.

Another feature of the invention is the provision of a spring retained closure on the disk for the container tube, the open end of the tube having an inwardly extending annular flange which prevents withdrawing of the lubricant as the nail is withdrawn, which flange is constructed with a recess to receive the nail as it is withdrawn, the closure having a similar recess to engage the nail, and when withdrawing the nail the spring of the closure bears the closure against the nail slightly, to prevent too much lubricant adhering to the nail as it is withdrawn.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a perspective view of a hammer showing the handle thereof constructed in accordance with the invention. Fig. 2 is an end view of the handle. Fig. 3 is a sectional view on line 3—3 of Fig. 2. Fig. 4 is a sectional view on line 4—4 of Fig. 3. Fig. 5 is a view similar to Fig. 2, showing the closure partly opened, so that a nail may be inserted and withdrawn.

Referring more particularly to the drawings, 1 designates the usual form of hammer having a handle 2, which is provided with a cylindrical bore 3. The object in view is to construct any form of stock hammer handle with a bore similar to the bore 3. The wax tube 4 is driven into the bore 3, the lugs 5 acting to prevent the tube from partially rotary displacement. This tube 4 is adapted to contain lubricant, grease or the like 6 and provided with an open end 7 having a substantially circular disk 8. The disk 8 is constructed with a flange 9 overlying or overhanging the hammer handle, and constituting a metal handle end, as shown clearly in Figs. 1 and 3. The open end of the tube is constructed with an annular flange 10, acting to prevent the lubricant or the like from being withdrawn as a nail is extracted. This flange 10 is constructed with a recess 11, which receives the nail as it is withdrawn, to prevent too much lubricant adhering to the nail. In other words, the excessive lubricant will be scraped off the nail as it is withdrawn through the recess. The circular disk of the tube is constructed with a recess 12, in which the closure member 13 is arranged, said closure member is riveted or otherwise pivoted by means of a pin or the like 14 to the substantially circular disk. One side of the recess 12, as shown at 15 is of a shape corresponding to the shape or contour of one edge of the closure member 13, which wall 15 acts as an abutment for the closure member. This closure member acts to close the open end of the tube, and is held against the wall 15, by means of the leaf spring 16, riveted or otherwise secured to the disk end of the tube, as shown clearly in Figs. 1, 2 and 5. The edge of the closure member which engages the wall 15 is constructed with a recess 18 corresponding slightly to the depth of the recess 11.

When it is desired to coat a nail with a thin layer of lubricant, the closure member 13 is thrown to one side against the action of the spring 16, as shown in Fig. 5, the nail is then inserted at the point *a* into the tube, the oppositely arranged recesses receiving the nail, the spring 16 forcing the recess 18 yieldably in contact with the nail. The nail is then withdrawn, the edges of the recesses acting to remove the excessive lubricant from the nail. The nail is then ready to be driven by means of the hammer into any hard wood, or the like, and it has been found by coating nails in this manner, they may be more easily driven home.

The invention having been set forth, what is claimed as new and useful is:—

A combination handle end and lubricant container for a tool handle comprising a disk and a tube projecting from one face of the disk and fitted within the tool handle, the disk fitting closely to the end of the handle, said tube and disk being constructed as a casting, said tube adjacent the disk having an open end provided with an inwardly extending annular flange provided with a recess, the outer face of the disk adjacent one edge being provided with a laterally extending flange extending over half the periphery of the disk, said laterally extending flange of the disk being provided with a curved wall, a closure pivoted flat against the disk adjacent one end of the lateral flange and fitting the curved wall of the lateral flange when closed, said closure having a recess in its peripheral edge and corresponding to and coöperating with the first recess to receive a nail and acting to remove an excessive lubricant from the nail, and a spring fixed to said lateral flange to hold the closure against said flange.

In testimony whereof I have signed my name to this specification in the presence of two subscribing witnesses.

ELMER E. ELLIS.

Witnesses:
EUCLIDE FOREST,
L. W. PIERCE.

Copies of this patent may be obtained for five cents each, by addressing the "Commissioner of Patents Washington, D. C."